Nov. 19, 1935.   F. L. MAIN   2,021,240
TIRE RIM
Filed Oct. 26, 1931   2 Sheets-Sheet 1

INVENTOR
Frank L. Main
BY
ATTORNEYS

Nov. 19, 1935.  F. L. MAIN  2,021,240
TIRE RIM
Filed Oct. 26, 1931  2 Sheets-Sheet 2
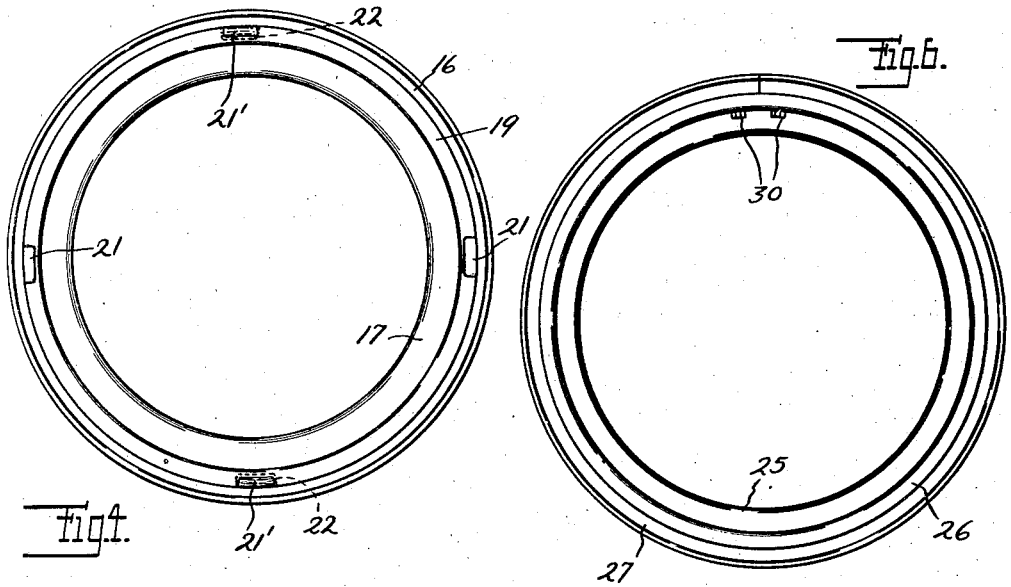
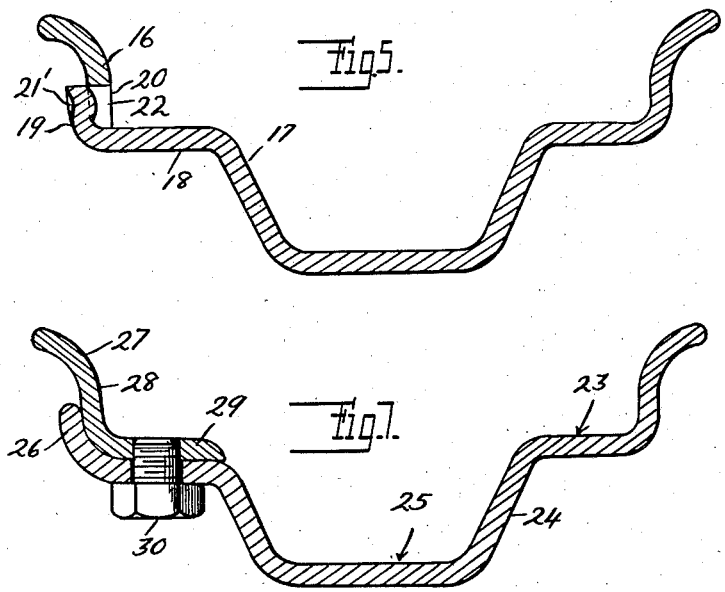
INVENTOR
Frank L. Main
BY
ATTORNEYS Patented Nov. 19, 1935

2,021,240

UNITED STATES PATENT OFFICE 2,021,240

TIRE RIM

Frank L. Main, Detroit, Mich., assignor, by mesne assignments, to The Kelsey-Hayes Wheel Company, Detroit, Mich., a corporation of Delaware Application October 26, 1931, Serial No. 571,255

1 Claim. (Cl. 152—21)

The invention relates to rims and more particularly to tire carrying rims for use especially with motor vehicle wheels. One of the objects of the invention is to provide an improved construction of tire carrying rim having an endless base member and a side ring so arranged that the rim effectively retains the tire and provides for ready manual removal or mounting of the tire without damaging the same. Another object is to provide an improved construction of dropcenter rim having a well and a side ring for facilitating removal or mounting of the tire. A further object is to so construct the rim that the side ring is effectively secured in place. These and other objects of the invention will become apparent from the following description, taken in connection with the accompanying drawings, in which Figure 1 is a front elevation of a tire carrying rim showing an embodiment of my invention;

Figures 4 and 5 are views respectively similar to Figures 1 and 2 showing another embodiment of my invention;

Figures 6 and 7 are views respectively similar to Figures 1 and 2 and showing another embodiment of my invention.

Figure 1:
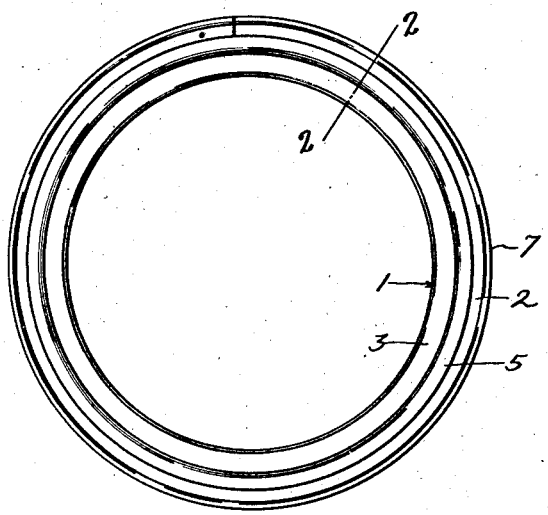
Figure 2:
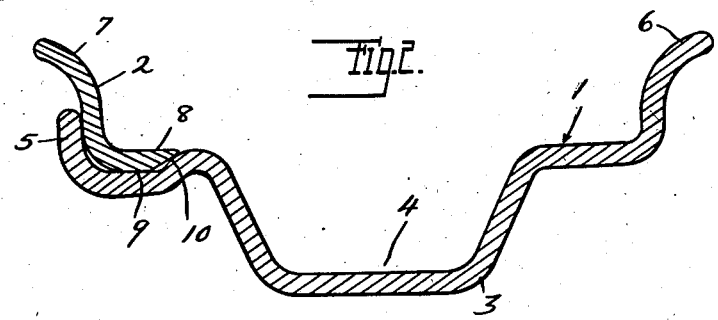
Figure 2 is a cross section on the line 2—2 of Figure 1.

The tire carrying rim, as shown in Figures 1 and 2, comprises the annular base member 1 and the side ring member 2. The base member has the endless or solid annular base 3 which is provided intermediate its edges with the peripherally extending annular relatively deep well 4 and also has at one edge and preferably the front edge of the base the peripherally and outwardly extending annular flange 5 integral with the base and of greater diameter than the base. The base member preferably has at the other edge of the base and integral therewith the peripherally and outwardly extending annular tire retaining flange 6.

The side ring member 2 is annular and is located between the well 4 and the side flange 5. This side ring is of angle shaped cross section and comprises the peripherally and outwardly extending tire retaining flange portion 7 and the integral transverse base portion 8. The base 3 of the base member between the well 4 and the side flange 5 is formed with the peripherally extending annular relatively wide shallow gutter 9 for receiving the side ring, which latter is preferably transversely split at one point only in its circumference. The rear side 10 of the gutter is tapered inwardly and forwardly toward the flange 5 and the rear edge of the base portion 8 of the side ring is also preferably correspondingly tapered, so that after a tire has been mounted upon the rim and the side ring has been passed over the annular flange 5 and inserted in place pressure exerted by the tire while being inflated causes the side ring to move inwardly into the gutter and to ride down the tapered rear face of the gutter to close the gap between the adjacent ends of the side ring and to bring the side ring into abutment with the adjacent side flange of the base member.

Figure 3:
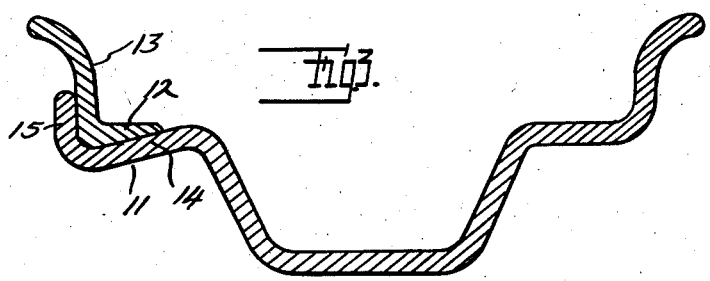
Figure 3 is a view similar to Figure 2 showing another embodiment of my invention.

The modification shown in Figure 3 differs essentially from that shown in Figures 1 and 2 in the shape of the gutter 11 and the base portion 12 of the side ring 13. The gutter 11, instead of being channel-shaped, is V-shaped with its rear side 14 tapering inwardly and forwardly toward the side flange 15.

Figures 4 and 5 disclose another modification of rim, in the base member of which the groove for receiving the side ring 16 is omitted. In this construction the base member 17 of the rim has at one edge and preferably at the front edge of its base 18 the peripherally and outwardly extending annular flange 19, which is of greater diameter than the base. The side ring 20 is endless or solid and has the inner portion inside and abutting the flange 19 and adapted to be held thereagainst by the tire when inflated. For the purpose of assembling the side ring with the base member, the side flange 19 is provided with the diametrically opposite recesses or notches 21 at its outer edge and the inner portion of the side ring 20 is provided with the corresponding recesses or notches 22 at its inner edge. The recesses or notches 22 are adapted to register with the recesses or notches 21 to permit a combined buttoning and threading on of the side ring upon the base member, during which the side ring is rotated in a peripheral or circumferential direction to locate the recesses or notches intermediate the recesses or notches 21, at which time the recesses or notches 22 register with the lateral depressions 21' in the side flange 19 and are engaged thereby when the tire is inflated to effectively secure the side ring upon the base member.

In the modification shown in Figures 6 and 7, the tire carrying rim is also of the drop-center type, its base member 23 having the base 24 provided intermediate its edges with the peripherally extending annular well 25. The base member also has the side flange and preferably the front flange 26 extending peripherally and outwardly and of greater diameter than the base. 27 is the side ring of angle shaped cross section having the peripherally and outwardly extending tire retaining flange portion 28 and the transverse base portion 29. This side ring is transversely split at one point in its circumference and its base portion is adapted to rest upon the base of the base member between the side flange 26 and the well 25. For the purpose of securing the side ring upon the base member with the adjacent ends of the side ring in close proximity to each other, I have provided the securing bolts 30 which extend outwardly through the base of the base member and are threaded into the base portion 29 of the side ring adjacent to the split. These securing members are located opposite to the valve stem hole of the rim and are of a size to counterbalance the valve stem and its associated parts to thereby serve in counterbalancing the rim and the tire assembly therewith.

From the above description, it will be seen that I have provided an improved construction of tire carrying rim having an endless or solid base member provided with a side flange at one edge of greater diameter and a side ring abutting this side flange and effectively retained by the same, so that the tire is effectively retained. It will also be seen that the side ring may be readily manually removed to provide for manually removing or mounting the tire without damaging the same and, more particularly, its beads or soft shoes at the inner edges of its beads. It will also be seen that the rim is constructed to be of the drop-center type to facilitate removal or mounting of the tire. Furthermore, it will be seen that the side ring is effectively retained in place with the gap between its adjacent ends in close proximity to each other.

What I claim as my invention is:

A tire carrying rim, comprising an annular base member having a base, an annular flange at one edge of said base and of greater diameter than said base and an annular gutter in said base adjacent to said flange, said gutter having a side tapered toward said flange, and an annular side ring having an outwardly extending tire retaining flange portion and a transverse base portion, said base portion extending within said gutter and engaging said tapered side and said flange portion abutting said flange.

FRANK L. MAIN.